(12) United States Patent
Ido et al.

(10) Patent No.: US 7,080,876 B2
(45) Date of Patent: Jul. 25, 2006

(54) ROOF MOLDING-FREE BODY STRUCTURE

(75) Inventors: Shinichi Ido, Shizuoka-Ken (JP); Harunaga Takada, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 47 days.

(21) Appl. No.: 10/999,012

(22) Filed: Nov. 29, 2004

(65) Prior Publication Data

US 2005/0116509 A1    Jun. 2, 2005

(30) Foreign Application Priority Data

Dec. 1, 2003  (JP) .............................. 2003-400948

(51) Int. Cl.
    *B60J 7/00* (2006.01)
(52) U.S. Cl. .................................................... 296/210
(58) Field of Classification Search ................ 296/210, 296/213, 185.3
    See application file for complete search history.

(56) References Cited

U.S. PATENT DOCUMENTS

| | | | |
|---|---|---|---|
| 4,833,855 A * | 5/1989 | Winter, IV ................. | 52/591.4 |
| 5,013,083 A * | 5/1991 | Yada et al. ................. | 296/210 |
| 5,873,618 A * | 2/1999 | Ejima ........................ | 296/30 |
| 6,056,526 A * | 5/2000 | Sato ........................... | 425/3 |
| 6,073,992 A * | 6/2000 | Yamauchi et al. ...... | 296/203.01 |
| 6,578,909 B1 * | 6/2003 | Reed et al. ................ | 296/210 |
| 6,877,798 B1 * | 4/2005 | Nakajima et al. ......... | 296/210 |
| 6,962,389 B1 * | 11/2005 | Katsuma .................... | 296/210 |

FOREIGN PATENT DOCUMENTS

| JP | 03112787 A | * | 5/1991 |
|---|---|---|---|
| JP | 10194055 A | * | 7/1998 |
| JP | 11124053 A | * | 5/1999 |
| JP | 2000-247259 A | | 9/2000 |
| JP | 2000247259 A | * | 9/2000 |

* cited by examiner

*Primary Examiner*—Kiran B. Patel
(74) *Attorney, Agent, or Firm*—Lerner, David, Littenberg, Krumholz & Mentlik, LLP

(57) ABSTRACT

The present invention provides a roof molding-free body structure of a type such that a molding is not provided in a joint portion between a roof panel 2 and a roof side rail 3. In a joint location between the roof panel 2 and the roof side rail 3, a substantially L-shaped joint portion 8 consisting of a vertical surface 6 and a joint surface 7 is formed in the upper inside part of a side body outer panel 4 of the roof side rail 3, and a joint portion 15 consisting of a semicircular curved surface 12, a leg surface 13 arranged so as to go away from the vertical surface 6 of the side body outer panel 4 toward the inside in the vehicle width direction, and a joint surface 14 arranged horizontally is formed at the outside edge in the vehicle width direction of the roof panel 2; the vertical surface 6 of the side body outer panel 4 and the curved surface 12 of the roof panel 2 are joined to each other; and a vertical height difference H is provided in the joint location between the roof panel 2 and the roof side rail 3.

4 Claims, 5 Drawing Sheets

ROOF MOLDING-FREE BODY STRUCTURE

BACKGROUND OF THE INVENTION AND RELATED ART STATEMENT

1. Field of the Invention

The present invention relates to a roof molding-free body structure on the automobile roof side.

2. Description of Related Art

Generally, a roof panel 51 of an automobile and a side body panel 52a of a roof side rail 52 as shown in FIG. 6 are joined to each other by spot welding in a state in which an outside edge portion and an inside edge portion are lapped on each other. Therefore, welding traces of spot welds W are produced on the outside surface of the roof panel 51, which undesirably impairs the appearance. To solve this problem, a resin part called a molding 53 is mounted to the joint portion to conceal the welding traces.

Since body color varies widely according to vehicle type etc., if the molding 53 used is of one color of black, the appearance quality may be degraded depending on the body color. On the other hand, if the molding 53 is painted body color, the production cost increases. In addition, the molding 53 sometimes becomes uneven or is not mounted straight.

In such a situation, a roof molding-free body structure has conventionally been employed in which on the automobile roof side, no molding is provided in a joint portion between a roof panel and a roof side rail (refer to Patent Document 1, for example). For this roof molding-free body structure, an inclined portion extending upward on the outside in the vehicle width direction is formed in the upper part of a longitudinal wall portion of side body panel in the roof side rail, an inclined portion extending downward on the inside of vehicle body is formed in the outside edge portion in the vehicle width direction of the roof panel, and the inclined portion of side body panel and the inclined portion of roof panel are welded in a lapped state.

[Patent Document 1] Japanese Patent Provisional Publication No. 2000-247259

However, for the above-described roof molding-free body structure, since the side body panel of roof side rail and the inclined portion of roof panel are used as a joint portion, it is especially difficult to align the inclined portions vertically, and therefore much time is required for the assembling work of roof side, which makes it difficult to increase productivity. Also, for the conventional roof molding-free body structure, when the distance between the right and left roof side rails varies, a gap or inclination occurs in the joint portion, which degrades the appearance quality. Moreover, since a sealer material is applied in the upper part of the joint portion, there arises a problem of increased cost.

OBJECT AND SUMMARY OF THE INVENTION

The present invention has been made in view of the above situation, and accordingly an object thereof is to provide a roof molding-free body structure in which the workability for assembling a joint portion between a roof panel and a roof side rail is improved, and the occurrence of a gap and inclination of the joint portion is prevented, thereby obtaining good appearance quality.

To solve the problems with the above-described related art, the present invention provides a roof molding-free body structure of a type such that a molding is not provided in a joint portion between a roof panel forming a roof portion of a body and a roof side rail extending in the longitudinal direction of the body, which is arranged on the outside in the vehicle width direction of the roof panel, wherein in a joint location between the roof panel and the roof side rail, a substantially L-shaped joint portion consisting of a vertical surface and a joint surface is formed in the upper inside part of a side body outer panel of the roof side rail, and on the other hand, a joint portion consisting of a semicircular curved surface, a leg surface arranged so as to go away from the vertical surface of the side body outer panel toward the inside in the vehicle width direction, and a joint surface arranged horizontally is formed at the outside edge in the vehicle width direction of the roof panel; the vertical surface of the side body outer panel and the curved surface of the roof panel are joined to each other; and a vertical height difference is provided in the joint location between the roof panel and the roof side rail.

Also, in the present invention, a recess portion having a substantially triangular or rectangular cross section is provided between the vertical surface of the side body outer panel and the leg surface of the roof panel, and the joint surface of the roof panel is mounted on the joint surface of the side body outer panel.

Further, in the present invention, the roof panel is continuously provided with a curved surface formed by bending the outside edge in the vehicle width direction, the leg surface, and the joint surface.

Still further, in the present invention, an upper corner portion of the curved surface of the roof panel and the vertical surface of the side body outer panel are joined to each other by a laser brazing continuous weld.

As described above, the roof molding-free body structure in accordance with the present invention is of a type such that a molding is not provided in the joint portion between the roof panel forming the roof portion of body and the roof side rail extending in the longitudinal direction of the body, which is arranged on the outside in the vehicle width direction of the roof panel, in which in the joint location between the roof panel and the roof side rail, the substantially L-shaped joint portion consisting of the vertical surface and the joint surface is formed in the upper inside part of the side body outer panel of the roof side rail, and on the other hand, the joint portion consisting of the semicircular curved surface, the leg surface arranged so as to go away from the vertical surface of the side body outer panel toward the inside in the vehicle width direction, and the joint surface arranged horizontally is formed at the outside edge in the vehicle width direction of the roof panel; the vertical surface of the side body outer panel and the curved surface of the roof panel are joined to each other; and the vertical height difference is provided in the joint location between the roof panel and the roof side rail. Therefore, even when the distance between the right and left roof side rails varies, the variations can be absorbed surely by pushing the vertical surface of the side body outer panel on the roof panel, and the workability for assembling the joint portion between the roof panel and the roof side rail can be improved. Moreover, according to the roof molding-free body structure in accordance with the present invention, the occurrence of a gap and inclination of the joint portion, which are caused by the above-described variations, can be prevented, so that the appearance quality of body can be upgraded.

Also, if, in the present invention, the recess portion having a substantially triangular or rectangular cross section is provided between the vertical surface of the side body outer panel and the leg surface of the roof panel, the recess portion can be used as a passage for discharging an electrocoating fluid at the time of body painting, so that the electrocoating fluid can be discharged to the outside easily, surely, and efficiently. Moreover, if the joint surface of the roof panel is mounted on the joint surface of the side body outer panel, the vertical positioning of the roof panel can be performed, so that the workability for assembling the roof side can further be improved.

Also, if, in the present invention, the roof panel is continuously provided with a curved surface formed by bending the outside edge in the vehicle width direction, the leg surface, and the joint surface, the rigidity of the outside edge portion of roof panel is increased, so that deformation of roof panel as a single unit can be prevented.

Also, if, in the present invention, the upper corner portion of the curved surface of the roof panel and the vertical surface of the side body outer panel are joined to each other by a laser brazing continuous weld, a body having a high rigidity and a good appearance can be obtained, so that the appearance quality can be upgraded. Moreover, the application of a sealer material is not needed, so that a reduced cost can be achieved.

DETAILED DESCRIPTION OF PREFERRED EMBODIMENTS

Embodiments of the present invention will now be described in detail with reference to the accompanying drawings.

Figure 1:
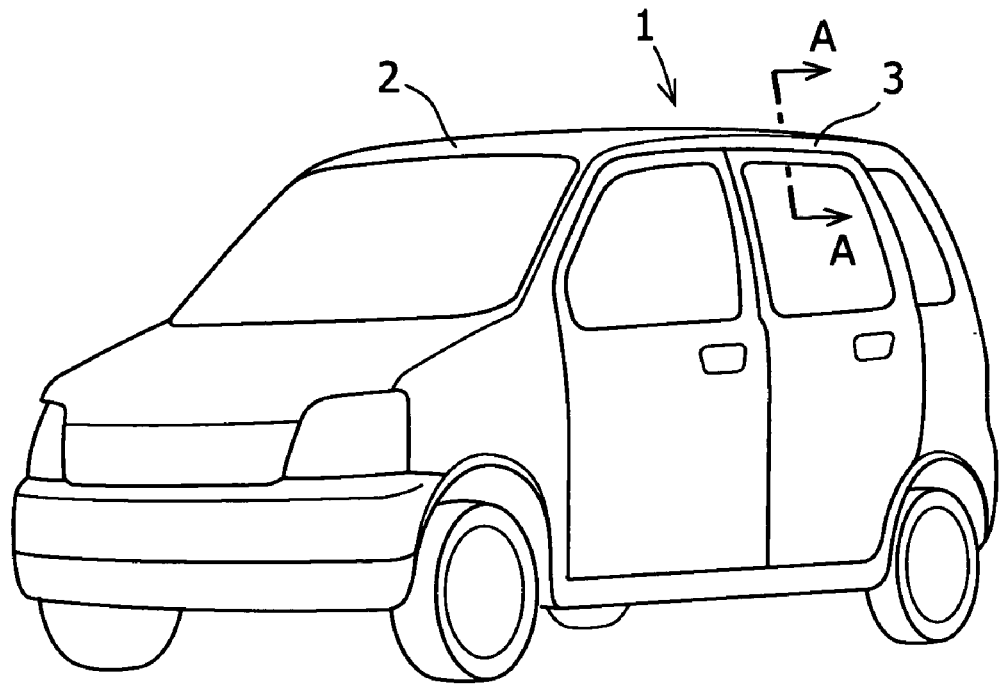
FIG. 1 is a perspective view showing the whole of an automobile to which a roof molding-free body structure in accordance with a first embodiment of the present invention is applied.
Figure 2:
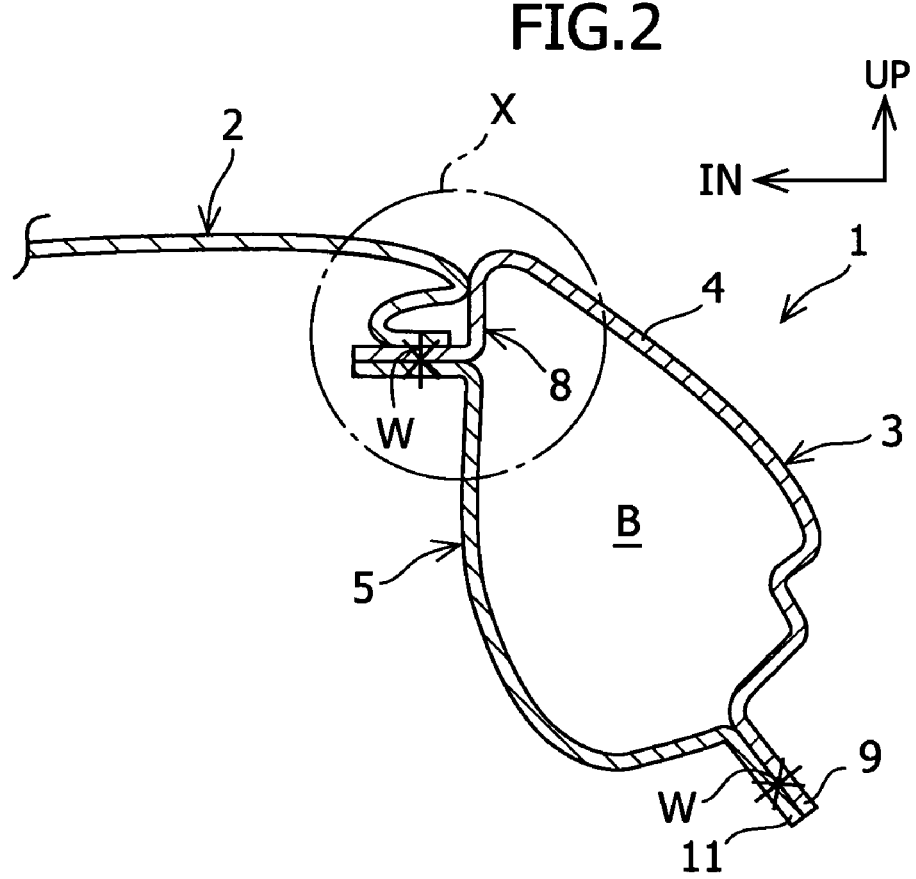
FIG. 2 is a sectional view taken along the line A—A of FIG. 1.
Figure 3:
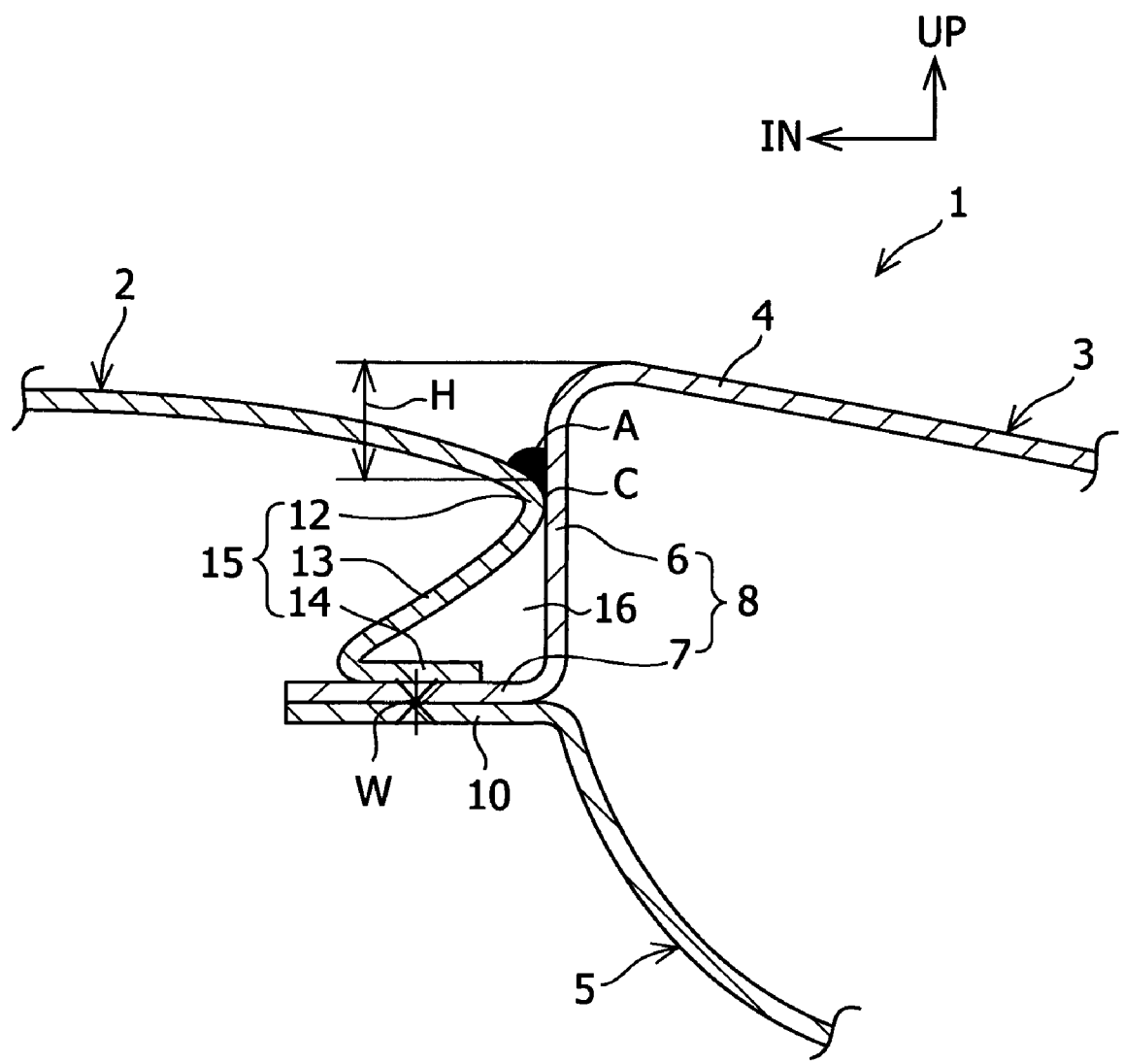
FIG. 3 is an enlarged view of portion X in FIG. 2.

FIGS. 1 to 3 show a first embodiment of a roof molding-free body structure in accordance with the present invention. A roof portion of a body 1 of an automobile to which the roof molding-free body structure of this embodiment is applied is formed by a roof panel 2 as shown in FIGS. 1 to 3, and roof side rails 3 extending in the body length direction are provided in both outside edge portions in the vehicle width direction of the roof panel 2. In this embodiment, moreover, since the roof molding-free body structure is adopted, a resin part such as a molding is not disposed in a joint portion between the roof panel 2 and the roof side rail 3. In FIGS. 2 and 3, an arrow mark UP indicates the upward direction with respect to the body, and an arrow mark IN indicates the inside direction in the vehicle width direction.

As shown in FIGS. 2 and 3, the roof side rail 3 of this embodiment is made up of a side body outer panel 4 forming a part of body side and a rail roof side inner panel 5 disposed on the inside in the vehicle width direction of the side body outer panel 4.

In the upper inside part of the side body outer panel 4, there is formed a substantially L-shaped joint portion 8 consisting of a vertical surface 6 extending downward with respect to the body 1 and an upper joint surface 7 that is continuous with the vertical surface 6 and extends inward in the vehicle width direction. Moreover, in the lower part of the side body outer panel 4, there is formed a lower joint surface 9 that is formed by bending the outside edge portion in the vehicle width direction and extends downward with respect to the body 1. Also, in the upper part of the rail roof side inner panel 5, there is formed an upper joint surface 10 that is formed by bending the inside edge portion in the vehicle width direction and extends inside in the vehicle width direction. In the lower part of the rail roof side inner panel 5, there is formed a lower joint surface 11 that is formed by bending the outside edge portion in the vehicle width direction and extends downward with respect to the body 1.

Therefore, for the roof side rail 3, the side body outer panel 4 and the rail roof side inner panel 5 are joined to each other by spot welds W in the state in which the upper and lower joint surfaces 7 and 9 of the side body outer panel 4 and the upper and lower joint surfaces 10 and 11 of the rail roof side inner panel 5 are lapped on each other, respectively, by which a closed cross-sectional portion B extending in the longitudinal direction of the body 1 is formed.

On the other hand, in the outside edge portion in the vehicle width direction of the roof panel 2 of this embodiment, as shown in FIGS. 2 and 3, there is formed a substantially Z-shaped joint portion 15 consisting of a substantially semicircular curved surface 12 bent downward, an inclined surface shaped leg surface 13 that is continuous with the curved surface 12 and inclinedly extends downward to the inside in the vehicle width direction so as to go away from the vertical surface 6 of the side body outer panel 4, and a joint surface 14 that is continuous with the leg surface 13 and is arranged in the horizontal direction by being bent to the outside in the vehicle width direction. That is to say, the roof panel 2 is constructed so that the height thereof can be adjusted by only the substantially Z-shaped joint portion 15 regardless of the vertical surface 6 of the side body outer panel 4.

On the joint surface 7 of the side body outer panel 4, the joint surface 14 of the roof panel 2 is mounted. Also, the upper corner portion of the curved surface 12 of the roof panel 2 and the vertical surface 6 of the side body outer panel 4 are joined to each other by a laser brazing continuous weld A. Moreover, in the joint location between the roof panel 2 and the roof side rail 3, a vertical height difference H is provided between the upper corner portion of the curved surface 12 and the upper end portion of the vertical surface 6 of the side body outer panel 4. This portion of the height difference H has a function of a rain rail (eaves trough) for preventing rainwater etc. from getting over the roof side rail 3 and dropping to the door side.

Furthermore, between the vertical surface 6 of the side body outer panel 4 and the leg surface 13 of the roof panel 2, there is provided a recess portion 16 having a substantially triangular cross section, which can be used as a passage for discharging an electrocoating fluid at the time of body painting.

When the roof molding-free body structure of the first embodiment of the present invention is assembled, first, the roof side rail 3 is erected substantially vertically, and the roof panel 2 is mounted from the upside, by which the position in the height direction of the roof panel 2 is determined. Next, the roof side rail 3 is pushed on the roof panel 2 to eliminate a gap C between the curved surface 12 of the roof panel 2 and the vertical surface 6 of the side body outer panel 4 of the roof side rail 3. Subsequently, the laser brazing continuous weld A is made by applying a laser to the upper corner portion of the curved surface 12 of the roof panel 2 and the vertical surface 6 of the side body outer panel 4 from the upside by using a laser welding machine, not shown. Thereby, the roof panel 2 and the roof side rail 3 are assembled to each other, by which the roof molding-free body structure of this embodiment can be obtained (refer to FIGS. 2 and 3).

Figure 4:
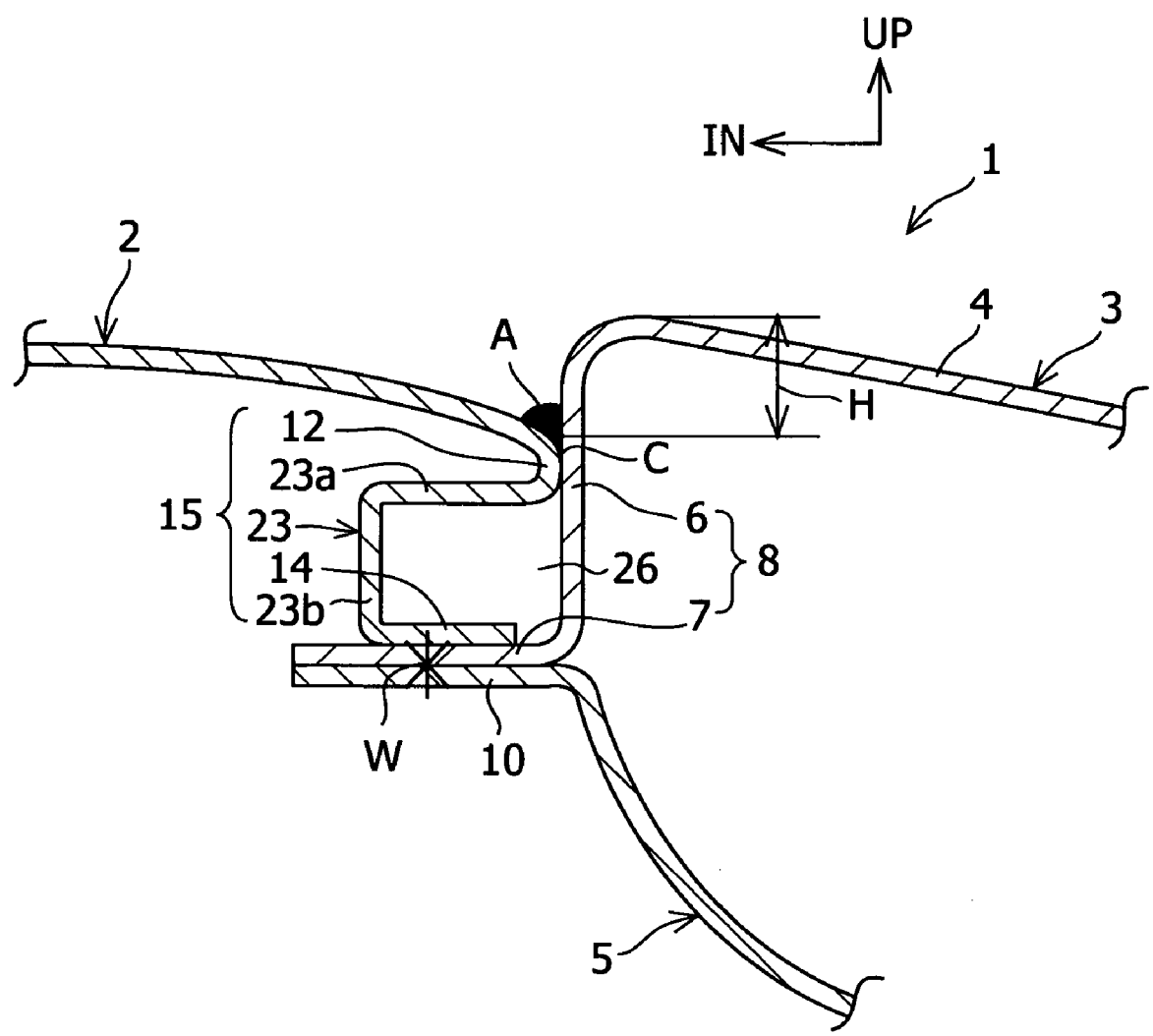
FIG. 4 is a sectional view taken along the line A—A of FIG. 1, showing a roof molding-free body structure in accordance with a second embodiment of the present invention.

FIG. 4 shows a second embodiment of the roof molding-free body structure in accordance with the present invention. In the second embodiment, the same reference numerals are applied to the same elements as those in the first embodiment, and the explanation of these elements is omitted.

The roof molding-free body structure in accordance with the second embodiment differs from the first embodiment in that as shown in FIG. 4, a leg surface 23 of the roof panel 2 is not the inclined surface shaped leg surface 13, and is formed by a horizontal surface 23a extending inward in the vehicle width direction so as to go away from the vertical surface 6 of the side body outer panel 4 and a vertical surface 23b continuous with the horizontal surface 23a. Accordingly, a recess portion 26 having a substantially rectangular cross section, which can be used as a passage for discharging an electrocoating fluid at the time of body painting, is provided between the vertical surface 6 of the side body outer panel 4 and the leg surface 23 of the roof panel 2. Other constructions, effects, and an assembling procedure are the same as those in the first embodiment.

Figure 5:
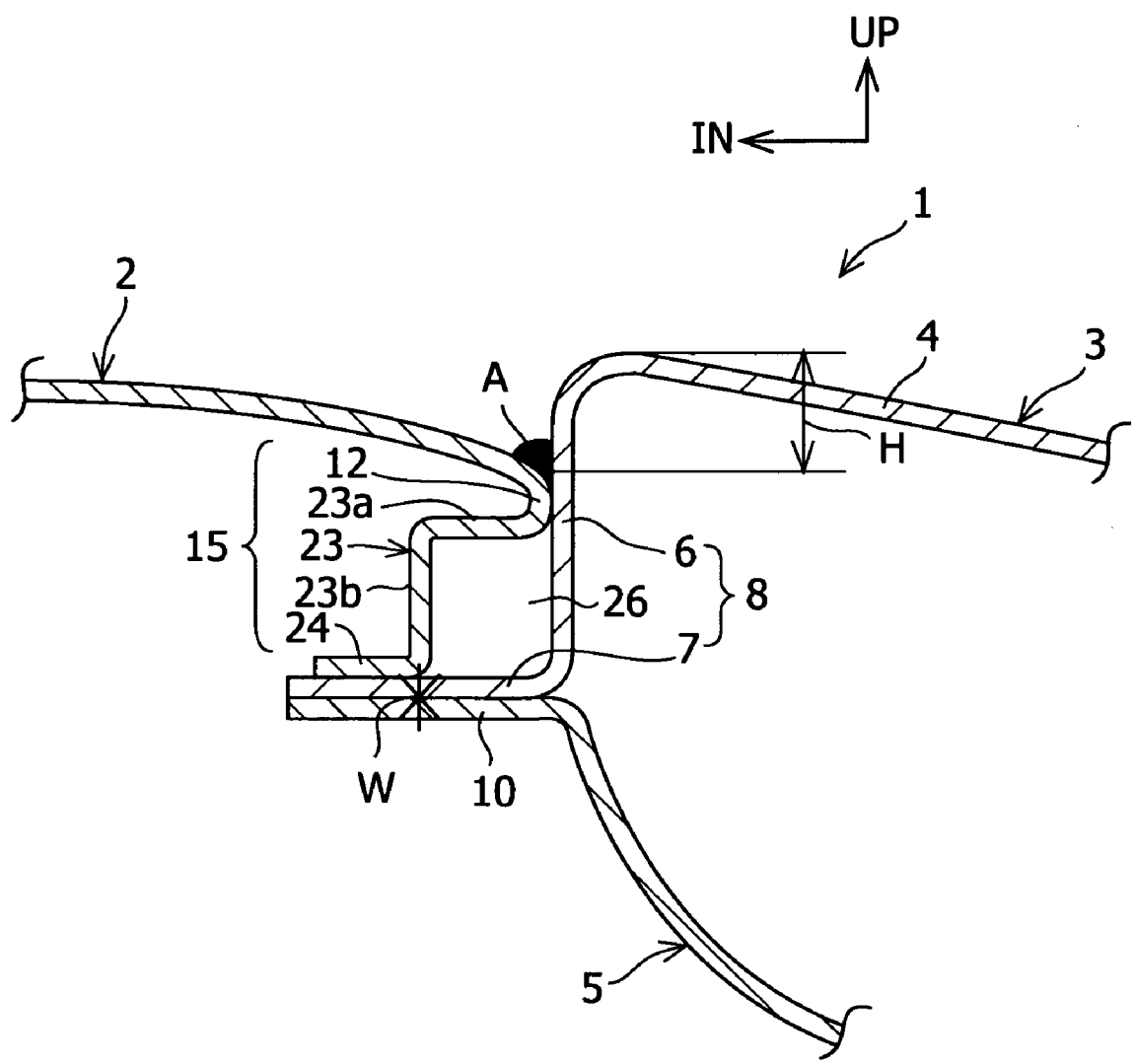
FIG. 5 is a sectional view taken along the line A—A of FIG. 1, showing a roof molding-free body structure in accordance with a third embodiment of the present invention.
Figure 6:
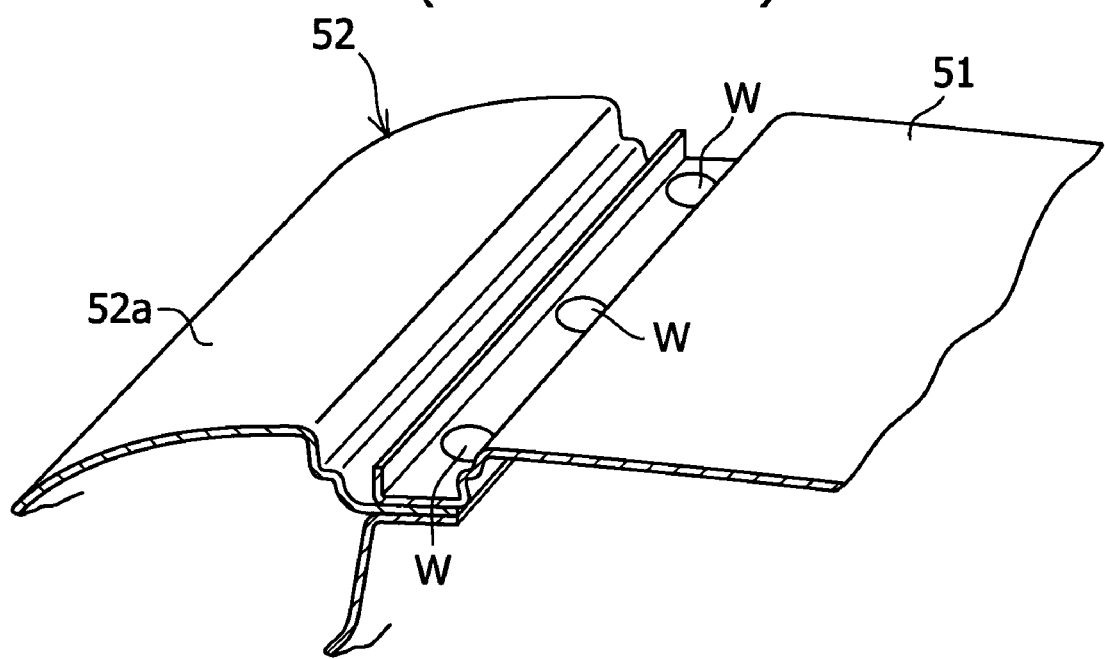
FIG. 6 is a perspective view showing a state before a molding is mounted in the joint portion between a roof panel and a roof side rail in a conventional automotive roof side structure.
Figure 7:
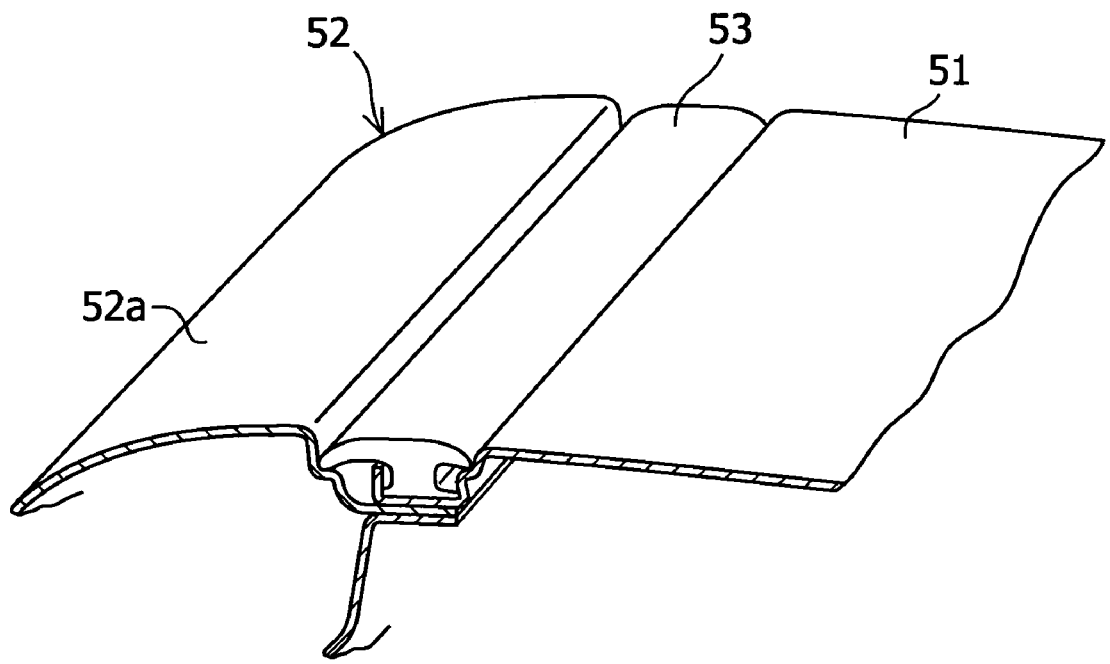
FIG. 7 is a perspective view showing a state after a molding has been mounted in the joint portion between a roof panel and a roof side rail in a conventional automotive roof side structure.

FIG. 5 shows a third embodiment of the roof molding-free body structure in accordance with the present invention. In the third embodiment, the same reference numerals are applied to the same elements as those in the first and second embodiments, and the explanation of these elements is omitted.

The roof molding-free body structure in accordance with the third embodiment differs from the first embodiment in that as shown in FIG. 5, the leg surface 23 of the roof panel 2 is not the inclined surface shaped leg surface 13, and is formed by the horizontal surface 23a extending inward in the vehicle width direction so as to go away from the vertical surface 6 of the side body outer panel 4 and the vertical surface 23b continuous with the horizontal surface 23a, and that a joint surface 24 is arranged horizontally by being bent to the inside in the vehicle width direction so as to be continuous with the vertical surface 23b of the leg surface 23. Accordingly, a recess portion 26 having a substantially rectangular cross section, which can be used as a passage for discharging an electrocoating fluid at the time of body painting, is provided between the vertical surface 6 of the side body outer panel 4 and the leg surface 23 of the roof panel 2. Other constructions, effects, and an assembling procedure are the same as those in the first embodiment.

The above is a description of the embodiments of the present invention. The present invention is not limited to the above-described embodiments, and various changes and modifications can be made based on the technical concept of the present invention.

The invention claimed is:

1. A roof molding-free body structure of a type such that a molding is not provided in a joint portion between a roof panel forming a roof portion of a body and a roof side rail extending in the longitudinal direction of the body, which is arranged on the outside in the vehicle width direction of said roof panel, wherein in a joint location between said roof panel and said roof side rail, a substantially L-shaped joint portion consisting of a vertical surface and a joint surface is formed in the upper inside part of a side body outer panel of said roof side rail, and on the other hand, a joint portion consisting of a semicircular curved surface, a leg surface arranged so as to go away from the vertical surface of said side body outer panel toward the inside in the vehicle width direction, and a joint surface arranged horizontally is formed at the outside edge in the vehicle width direction of said roof panel; the vertical surface of said side body outer panel and the curved surface of said roof panel are joined to each other; and a vertical height difference is provided in the joint location between said roof panel and said roof side rail.

2. The roof molding-free body structure according to claim 1, wherein a recess portion having a substantially triangular or rectangular cross section is provided between the vertical surface of said side body outer panel and the leg surface of said roof panel, and the joint surface of said roof panel is mounted on the joint surface of said side body outer panel.

3. The roof molding-free body structure according to claim 1, wherein said roof panel is continuously provided with said curved surface formed by bending the outside edge in the vehicle width direction, said leg surface, and said joint surface.

4. The roof molding-free body structure according to any one of claims 1 to 3, wherein an upper corner portion of the curved surface of said roof panel and the vertical surface of said side body outer panel are joined to each other by a laser brazing continuous weld.

* * * * *